May 7, 1957 G. A. VASEL 2,791,052
PRINTING PLATE
Filed Nov. 1, 1954
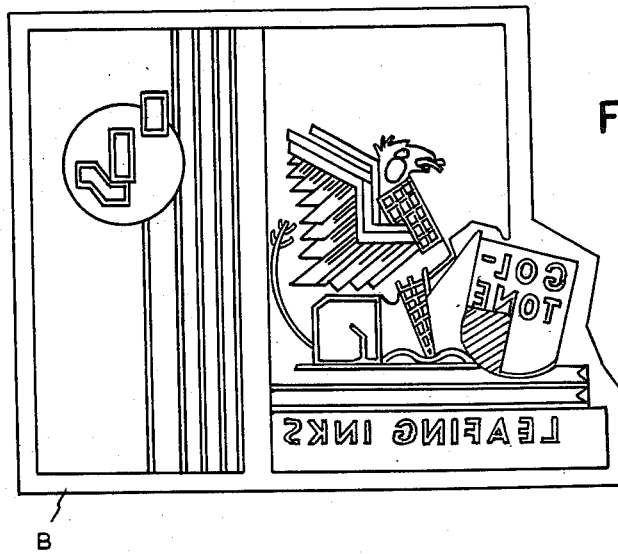
FIG.1.
FIG.2.
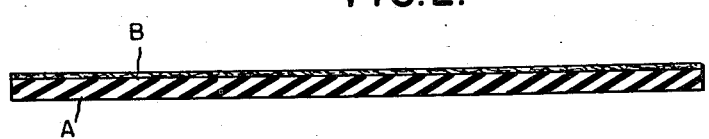
FIG.3.
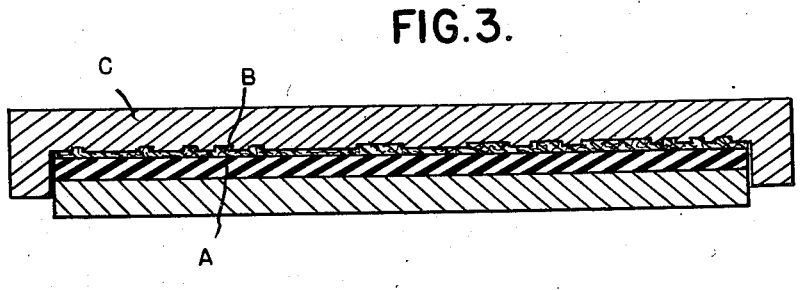
INVENTOR.
GUSTAV A. VASEL
BY
ATTORNEYS

United States Patent Office 2,791,052
Patented May 7, 1957

2,791,052
PRINTING PLATE

Gustav A. Vasel, Philadelphia, Pa.

Application November 1, 1954, Serial No. 466,119

3 Claims. (Cl. 41—25)

The invention relates to a new article of manufacture consisting of a flexible laminated sheet including a metalized surface ply.

It is the object of the invention to obtain a construction more particularly designed for use in printing and in which the typed or patterned surface is harder than that of rubber-like material without loss of flexibility.

It is a further object to obtain a printing surface which is sharper in detail with greater durability and further to obtain a surface which protects the body material from the ink vehicle.

With these objects in view the invention consists in the construction and method of forming the same hereinafter set forth.

In the accompanying drawings:

Fig. 1 is a plan view of the typed or patterned metalized surface.

Fig. 2 is an enlarged cross section.

Fig. 3 is a cross section illustrating the method of manufacture.

Generally described the strucure comprises a rubber or rubber-like layer A, such for instance as Neoprene, a synthetic rubber from the class of chloroprene polymers; natural rubber; Hycar, a synthetic rubber from the class of butadiene polymers and copolymers; butyl, a synthetic rubber from the class of isobutylene polymers; or other synthetics. This layer is compounded with the proper amount of filler, antioxidant and curing agent and may be varied in thickness. There is also a metalized ply B which may be formed of a vinyl chloride or vinylidene chloride resin compound suitably plasticized and stabilized and containing two or three percent of metallic powder, being of a thickness of .008–.012 of an inch.

The two layers are bonded together by placing the top layer B against the typed or patterned face of the mold cavity in a mold C and placing the ply A against the ply B. The mold is then placed in a press and subjected to the heat 290°–300° F. and pressure 200 pounds per square inch for approximately five minutes to vulcanize the rubber backing and bond the same to the metalized ply to produce an integral structure having a metalized surface which, as shown in Fig. 1, provides high resolution of the patterned face of the mold.

The structure and method of forming the same thus generally described may be specifically varied. For instance, the metalized ply may be formed as follows:

A blend of a vinyl chloride polymer and a vinyl chloride-vinylidene chloride copolymer is used as the resin in the composition. The resin blend may be plasticized with one or a combination of two or more plasticizers of the ester and/or polymeric types. The material is suitably stabilized for heat and light using materials such as, barium-cadmium complex salts or an organic tin complex. A small amount of high melting wax, also stearic acid are added for lubrication. The material is metalized by the incorporation of aluminum powder. To meet with varied requirements for specific end uses the ratios of the plasticizer blends, also the total amounts of same used must necessarily be varied. Total plasticizer content may vary from 35 to 50 P. P. H. R., but will chiefly be within the range of 40 to 45 P. P. H. R. The amounts of aluminum powder used may also have to vary slightly to meet with special requirements in end use; however, the amounts found best for general use are from one to five parts per hundred parts resin.

Two typical formulas follow:

| | 1 | 2 |
|---|---|---|
| Copolymer-Vinyl Chloride-Vinylidene Chloride | 50.00 | 100.0 |
| Vinyl Chloride Polymer | 50.00 | X |
| Phthalic acid ester (Such as D. I. O. P.) | 19.00 | 13.0 |
| Phosphate plasticizer (Such as T. C. P.) | 7.50 | 2.0 |
| Adipic acid ester (Such as D. I. O. A.) | 14.00 | X |
| Dicyclohexyl Phthalate (Barrett D. C. H. P.) | X | 20.0 |
| Polymeric Plasticizer (G-62) | 2.0 | 5.0 |
| High M. P. Wax (Acrowax) | 0.1875 | 0.1875 |
| BaCd salt (Mark M) | 3.0 | X |
| Organo-tin complex (Thermolite 99) | X | 1.5 |
| Triple Pressed Stearic Acid | 0.5 | 0.5 |
| Fine Aluminum Pdr. (Luxrite) | 4.5 | 4.5 |

In the foregoing table and other parts of the specification, the abbreviations used and their meanings are as follows:

D. I. O. P.—Di-iso-octyl-phthalate.
T. C. P.—Tri-cresyl-phosphate.
D. I. O. A.—Di-iso-octyl-adipate.
D. C. H. P.—Di-cyclo-hexyl-phthalate.
P. P. H. R.—Plasticizer per hundred parts of resin.

As above described the chief advantages of this structure when used as a printing plate are hardness of surface, sharpness in detail, great durability, and protection against the ink vehicle.

What I claim as my invention is:

1. A printing plate consisting of the following: a backing layer of a rubber-like material selected from the group consisting of natural and synthetic rubbers, a metalized surface layer consisting of a plasticized synthetic resin selected from the group consisting of vinyl chloride and vinylidene chloride having thoroughly mixed therein fine aluminum powder in amount upwardly of about one part per hundred parts of resin to about five parts, said metalized surface layer being bonded to the rubber-like layer with the external face of the metalized layer forming the patterned surface of the printing plate.

2. The printing plate of claim 1 in which said metalized surface layer has an initial thickness before application of the printing pattern of about one-hundredth of an inch.

3. A printing plate consisting of the following: a backing layer of a rubber-like material selected from the group consisting of natural and synthetic rubbers, a metalized surface layer consisting of a plasticized synthetic resin selected from the group consisting of vinyl chloride and vinylidene chloride having thoroughly mixed therein fine aluminum powder in amount upwardly of about one part per hundred parts of resin to about five parts, said metalized surface layer being bonded to the rubber-like layer by the application in a mold to both layers of heat and pressure to vulcanize said backing layer while bonding said metalized layer thereto, said mold having a surface carrying a printing pattern for simultaneously transferring said pattern to said metalized layer.

References Cited in the file of this patent
UNITED STATES PATENTS

| 2,028,712 | Swan et al. | Jan. 21, 1936 |
| 2,108,822 | Lippincott | Feb. 22, 1938 |
| 2,632,722 | Libberton | Mar. 24, 1953 |